(12) United States Patent
Lasher et al.

(10) Patent No.: US 10,097,609 B1
(45) Date of Patent: Oct. 9, 2018

(54) METHOD AND SYSTEM FOR DYNAMICALLY ADJUSTING A DATA RATE OF A VIDEO STREAM

(71) Applicant: Tribune Broadcasting Company, LLC, Chicago, IL (US)

(72) Inventors: Richard M. Lasher, San Jose, CA (US); Dana A. Lasher, Morgan Hill, CA (US); Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 187 days.

(21) Appl. No.: 15/200,696

(22) Filed: Jul. 1, 2016

(51) Int. Cl.
*G06F 15/16* (2006.01)
*H04L 29/06* (2006.01)
*H04L 12/835* (2013.01)

(52) U.S. Cl.
CPC ............ *H04L 65/601* (2013.01); *H04L 47/30* (2013.01); *H04L 65/607* (2013.01)

(58) Field of Classification Search
CPC .............................. H04L 47/30; H04L 65/60
USPC ......................................................... 709/231
See application file for complete search history.

(56) References Cited

U.S. PATENT DOCUMENTS

| | | |
|---|---|---|
| 8,908,005 B1 | 12/2014 | Leske et al. |
| 2004/0075750 A1 | 4/2004 | Bateman |
| 2006/0088092 A1 | 4/2006 | Chen et al. |
| 2009/0103607 A1* | 4/2009 | Bajpai ............. H04N 21/23406 375/240.02 |
| 2011/0105226 A1 | 5/2011 | Perlman |
| 2011/0158313 A1 | 6/2011 | Ogata |
| 2011/0267942 A1 | 11/2011 | Aybay et al. |
| 2011/0273606 A1 | 11/2011 | Hara |
| 2012/0093505 A1* | 4/2012 | Yeap .................. H04L 12/2889 398/45 |

OTHER PUBLICATIONS

International Search Report and Written Opinion dated Sep. 25, 2017 issued in connection with International Application No. PCT/US2017/037262, filed on Jun. 13, 2017.
U.S. Appl. No. 15/200,741, entitled "Method and System for Dynamically Adjusting a Camera Setting for a Video Stream", filed Jul. 1, 2016.
Non-Final Office Action dated Nov. 15, 2017 for U.S. Appl. No. 15/200,741.
Final Office Action dated May 7, 2018 for U.S. Appl. No. 15/200,741.

* cited by examiner

*Primary Examiner* — Glenford Madamba
(74) *Attorney, Agent, or Firm* — McDonnell Boehnen Hulbert & Berghoff LLP

(57) ABSTRACT

In one aspect, an example method for dynamically adjusting a data rate of a video stream includes: (i) generating, by a computing system, a video stream representing video content; and (ii) while generating the video stream: (a) determining, by the computing system, an amount of packets in a memory buffer; (b) determining, by the computing system, a time period since a data rate of the video stream was last adjusted; and (c) using, by the computing system, the determined amount of packets in the memory buffer and the determined time period since the data rate of the video stream was last adjusted as a basis to adjust the data rate of the video stream.

20 Claims, 3 Drawing Sheets

METHOD AND SYSTEM FOR DYNAMICALLY ADJUSTING A DATA RATE OF A VIDEO STREAM

USAGE AND TERMINOLOGY

In this disclosure, with respect to all reasonable derivatives of such terms, unless otherwise specified and/or unless the particular context clearly dictates otherwise, each usage of "a" or "an" means at least one, and each usage of "the" means the at least one.

BACKGROUND

Unless otherwise specified, the materials described in this section are not prior art to the claims in this disclosure and are not admitted to be prior art by inclusion in this section.

Computing systems, such as mobile phones, tablet computers, and laptop computers, can generate and output media content in the form of streaming media. For example, while a computing system is capturing video content using a camera, the computing system can provide the video content to other devices, in real-time, in the form of a live video stream.

SUMMARY

In a first aspect, an example method includes: (i) generating, by a computing system, a video stream representing video content; and (ii) while generating the video stream: (a) determining, by the computing system, an amount of packets in a memory buffer; (b) determining, by the computing system, a time period since a data rate of the video stream was last adjusted; and (c) using, by the computing system, the determined amount of packets in the memory buffer and the determined time period since the data rate of the video stream was last adjusted as a basis to adjust the data rate of the video stream.

In a second aspect, a non-transitory computer-readable medium is disclosed. The computer-readable medium has stored thereon instructions that, upon execution by a processor, cause performance of a set of acts including: (i) generating, by a computing system, a video stream representing video content; and (ii) while generating the video stream: (a) determining, by the computing system, an amount of packets in a memory buffer; (b) determining, by the computing system, a time period since a data rate of the video stream was last adjusted; and (c) using, by the computing system, the determined amount of packets in the memory buffer and the determined time period since the data rate of the video stream was last adjusted as a basis to adjust the data rate of the video stream.

In a third aspect, a computing system includes a memory buffer and is configured for performing a set of acts including: (i) generating a video stream representing video content; and (ii) while generating the video stream: (a) determining an amount of packets in the memory buffer; (b) determining a time period since a data rate of the video stream was last adjusted; and (c) using the determined amount of packets in the memory buffer and the determined time period since the data rate of the video stream was last adjusted as a basis to adjust the data rate of the video stream.

DETAILED DESCRIPTION

I. Overview

Figure 1:
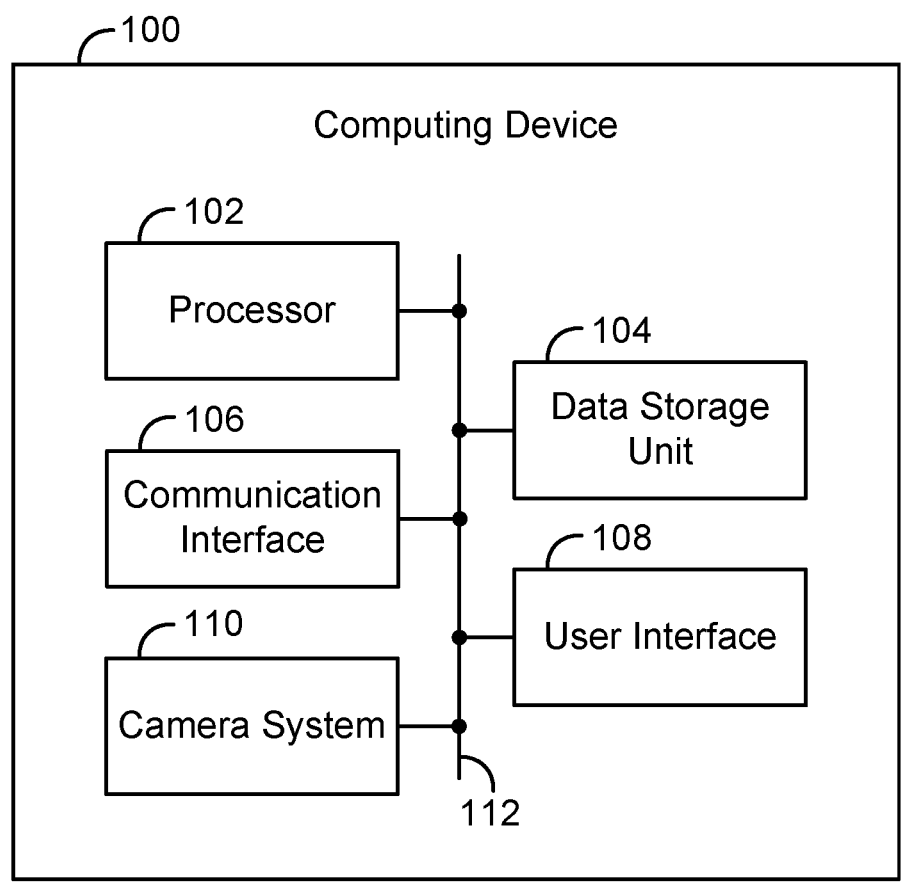
FIG. 1 is a simplified block diagram of an example computing device.

As indicated above, a computing system can generate a video stream representing video content and can provide the video stream to various devices. The computing system can generate the video stream in various ways. For example, a video-capturing device (e.g., a camera) of the computing system can capture video content, and an encoder of the computing system can encode the video content to generate a video stream having a particular data rate (e.g., a bit rate). The video stream can also be formatted into packets of data, which are stored temporarily in a memory buffer of the computing system before the computing system transmits the packets from the memory buffer to another entity, such as another memory buffer and/or another device.

In some instances, a video stream having a high data rate can have a high quality video stream, whereas a video stream having a low data rate can have a low quality video stream. However, a video stream with a high data rate can fill up the memory buffer at a faster rate than a video stream with a low data rate. Thus, the computing system may be able to continuously provide a low quality video stream with minimal or no latency, but may not be able to continuously provide a high quality video stream without undesirable latency.

The present disclosure provides a way to help the computing system maximize the quality of the video stream while minimizing latency of the video stream. In particular, the present disclosure provides a technique for dynamically adjusting a data rate of a video stream based on a consideration of time and a consideration of the amount of data packets in the memory buffer of the computing system.

According to the present disclosure, an example method includes a computing system generating a video stream representing video content, such as in the manner described above. The example method also includes, while generating the video stream, the computing system determining an amount of packets in the memory buffer and determining a time period since a data rate of the video stream was last adjusted. If no adjustment has yet been made to the data rate, the time period can be, for instance, a time period since the computing system initially selected a data rate for the video stream. Whereas, if any adjustments have been made to the data rate since the computing system began generating the video stream, the time period can be a time period since the most recent adjustment to the data rate.

Further, the method includes, while generating the video stream, the computing system using the determined amount of packets in the memory buffer and the determined time period since the data rate of the video stream was last adjusted as a basis to adjust the data rate of the video stream. In one example, if the computing system determines that the amount of packets in the memory buffer is less than a threshold amount of packets and that a threshold extent of time has passed since the data rate was last adjusted, the computing system can responsively increase the data rate of the video stream. This can allow the computing system to continuously provide the video stream at high quality with minimal or no latency.

Whereas, if the computing system determines that the amount of packets in the memory buffer is greater than a threshold amount of packets and that a threshold extent of time has passed since the data rate was last adjusted, the computing system can responsively decrease the data rate of the video stream. This can allow the computing system to keep the quality of the video stream as high as possible (although not as high as if the data rate was increased) while still being able to continue to provide the video stream with minimal or no latency.

II. Example Architecture

A. Computing Device

FIG. 1 is a simplified block diagram of an example computing device 100. Computing device 100 can perform various acts and/or functions, such as those described in this disclosure (including the accompanying drawings). Computing device 100 can include various components, such as processor 102, data storage unit 104, communication interface 106, user interface 108, and/or camera system 110. These components can be connected to each other (or to another device, system, or other entity) via connection mechanism 112.

In this disclosure, the term "connection mechanism" means a mechanism that facilitates communication between two or more devices, systems, or other entities. A communication mechanism can be a relatively simple mechanism, such as a cable or system bus, or a relatively complex mechanism, such as a packet-based communication network (e.g., the Internet). In some instances, a connection mechanism can include a non-tangible medium (e.g., where the connection is wireless).

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108.

Data storage unit 104 can also store other types of data, such as those types described in this disclosure. In one example, data storage unit 104 can include one or more memory buffers that can receive, from one or more other components of computing device 100, a video stream in the form of data packets and can then temporarily store the data packets. In some instances, the memory buffer(s) can take the form of a data queue (i.e., a memory buffer that employs a First-In First-Out (FIFO) scheme).

Communication interface 106 can allow computing device 100 to connect to and/or communicate with another entity according to one or more protocols. In one example, communication interface 106 can be a wired interface, such as an Ethernet interface or a high-definition serial-digital-interface (HD-SDI). In another example, communication interface 106 can be a wireless interface, such as a cellular (e.g., 4G or 3G) or a Wi-Fi interface. Each connection described in this disclosure can be a direct connection or an indirect connection, the latter being a connection that passes through and/or traverses one or more entities, such as such as a router, switcher, or other network device. Likewise, each transmission described in this disclosure can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system.

Camera system 110 can include various components for facilitating capture and processing of video content, such as a camera, a frame grabber, and an encoder. The camera can capture video content in the form of a series of still digital images, or "frames," and perhaps then transmit the video content to the encoder. The frame grabber can interface with the camera to assist in capturing the video content, such as by receiving the video content from the camera and then storing the video content and/or transmitting the video content to the encoder. The encoder can receive the video content from the frame grabber (or, in some instances, directly from the camera itself), encode the video content to generate a video stream, format the video stream into data packets, and transmit the packets of the video stream to data storage unit 104. In one example, the encoder can transmit packets of the video stream to a memory buffer of data storage unit 104, which can receive and temporarily store the packets.

The encoder can encode video content according to various standards. For example, the encoder can encode video content in accordance with the H.264 (MPEG-4 AVC) standard, the MPEG-2 Part 2 standard, or the VP8 standard. The encoder can also be configured to encode corresponding audio content according to various standards such as MP3 or AAC. In one example, the encoder can be included as a component separate from the rest of camera system 110.

Computing device 100 can take various forms, such as a workstation, a desktop computer, a laptop, a tablet, a television, a set-top box, and/or a mobile phone (e.g., a smart phone).

B. Computing System

Figure 2:
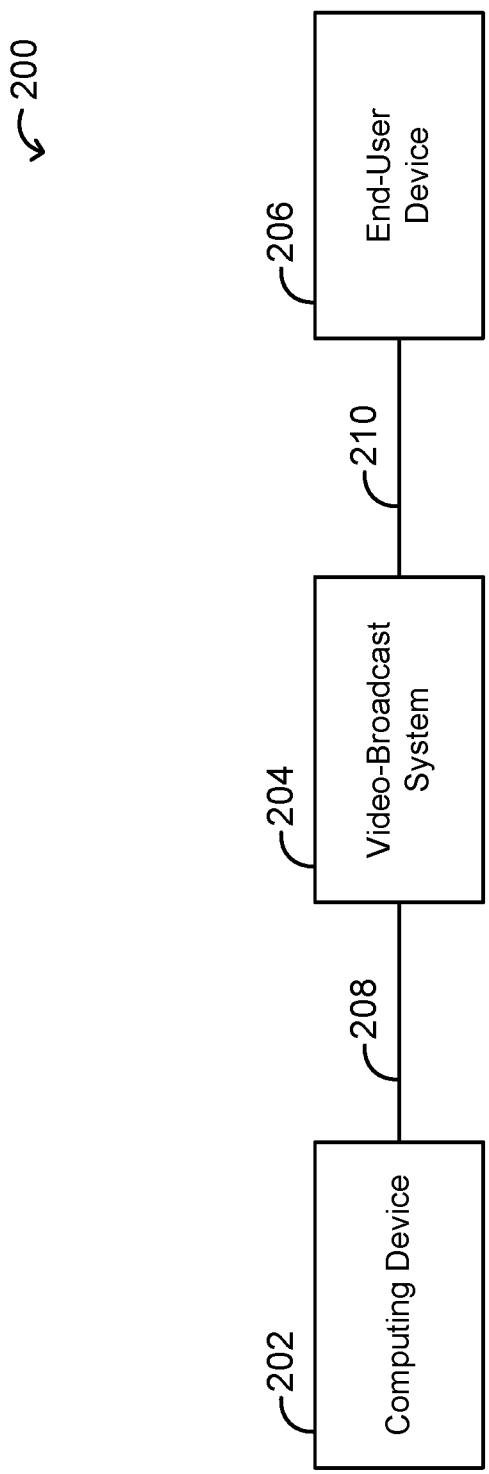
FIG. 2 is a simplified block diagram of an example computing system.

FIG. 2 is a simplified block diagram of an example computing system 200. In this disclosure, a computing system is a system that includes at least one computing device. In some instances, a computing system can include at least one other computing system.

Computing system 200 can include various components, such as computing device 202 (e.g., computing device 100), video-broadcast system (VBS) 204, and end-user device 206, each of which can be implemented as a computing system. Computing system 200 can also include connection mechanism 208, which connects computing device 202 with VBS 204; and connection mechanism 210, which connects VBS 204 with end-user device 206.

Computing device 202 can take various forms. For instance, computing device 202 can take the form of computing device 100 described above. As such, computing device 202 can generate video content such as a video stream. As computing device 202 generates the video stream, one or more components of computing system 200, such as VBS 204, can receive the video stream from computing device 202 and can in turn provide the video stream to an end-user device. In this manner, an end user can view a live video stream being generated by computing device 202.

VBS 204 can receive the video content and transmit the video content to end-user device 206 for presentation of the video content to an end user via a user interface. In practice, VBS 204 can transmit video content to a large number of end-user devices for presentation of the video content to a large number of end users. VBS 204 can include various components, such as a terrestrial antenna or a satellite, each of which can be implemented as a computing system. VBS 204 can also include a video-production system (VPS) that is configured to receive video content from computing device 202 and/or generate its own video content. Either type of video content can serve as or be made part of a video program (e.g., a news program).

In this disclosure, the term "video broadcast" means the distribution of video content via any means. As such, VBS 204 can transmit video content to end-user device 206 in various ways. For example, VBS 204 can transmit video content to end-user device 206 over-the-air or via a packet-based network such as the Internet.

Video content can be generated, transmitted, and/or received in various ways and/or according to various standards. For example, the act of generating video content can include generating a video stream representing the video content. As another example, the act of transmitting and/or receiving video content can include transmitting and/or receiving a video stream representing the video content, such as over Internet Protocol (IP) or in accordance with the HD-SDI standard. Also, the act of generating, transmitting, and/or receiving video content can include generating, transmitting, and/or receiving an encoded or decoded version of the video content.

Each of the video-based systems or devices described in this disclosure can include or be integrated with a corresponding audio-based system or device. Likewise, the video content described in this disclosure can include or be integrated with corresponding audio content. For instance, computing device 202 can encode video content to generate a video stream, encode corresponding audio content to generate an audio stream, and then combine the video stream with the corresponding audio stream to generate a multimedia stream for transmission to another system or device.

III. Example Operations

Computing system 200 and/or components of computing system 200 can perform various acts. These and related features will now be described.

A. Generating a Video Stream

As noted above, a computing system such as computing device 202 can generate a video stream representing video content.

The act of generating the video stream can be performed in various ways. In one example, in line with the discussion above, the camera (and perhaps additionally the frame grabber) of computing device 202 can capture video content in the form of a series of frames, and can then transmit the video content to the encoder of computing device 202. The encoder can then receive the video content from the camera or the frame grabber and can encode the video content in accordance with one or more encoding parameters to generate a video stream having a particular data rate. The encoder can also format the video stream into data packets and can transmit the packets to a memory buffer of computing device 202, which in turn can receive and temporarily store the packets.

A data rate of a video stream refers to an amount of data of the video stream that is streamed per unit of time. In some instances, a data rate of a video stream can take the form of a "bit rate" (or "bitrate") of the video stream, which is the number of bits of the video stream that are streamed per unit of time, and which is quantified using units such as bits per second (bit/s, or bps). For example, a video stream having a bitrate of 500 kilobits per second (kbps) means that each second of the video stream contains 500 kilobits of data (i.e., the video stream is streamed at a rate of 500 kilobits per second).

A data rate of a video stream can affect various properties of the video stream, such as the quality (e.g., resolution) and size (i.e., the amount of data required to represent the video stream) of the video stream, as well as the rate at which the video stream takes up space in the memory buffer. To illustrate this, consider for example a first video stream having a first data rate and a second video stream having a second data rate that is lower than the first data rate. In this example, the first video stream having the higher data rate can be of higher quality than the second video stream and can require a higher amount of data to represent the first video stream (and thus take up more space in the memory buffer) than the amount of data required to represent the second video stream. Further, the first video stream can take up space in the memory buffer at a faster rate than the second video stream due to the encoder having more data to send to the memory buffer for the first video stream compared to the second video stream. In addition, assuming uniform packet size, the amount of packets of the first video stream stored in the memory buffer can be larger than the amount of packets of the second video stream stored in the memory buffer.

Computing device 202 can select the data rate of the video stream, and can do so in various ways. In some examples, computing device 202 can select the data rate in a direct manner. For instance, computing device 202 can have stored various data rate options from which to choose, and can select a particular data rate to be used as a default data rate unless instructed or configured to select a different data rate. In another instance, a user of computing device 202 can specify a particular data rate via a user interface of computing device 202, thereby instructing computing device 202 to use the user-specified data rate.

In other examples, computing device 202 can select the data rate in an indirect manner. For instance, computing device 202 (e.g., the encoder of computing device 202) can have access to a table that maps various camera settings to corresponding data rates. Thus, computing device 202 can select a data rate by selecting a camera setting that maps to the desired data rate, as described in greater detail below.

The camera of computing device 202 can operate according to one or more camera settings, each of which can affect properties of the resulting video content that the camera captures. Examples of camera settings can include: (i) a resolution at which the camera captures the video content (e.g., 320×240, 1280×720, or 1920×1080), (ii) a frame rate at which the camera captures the video content (i.e., a number of individual frames that comprise each unit of time of the video content, such as 30 frames per second (fps)), and/or (iii) a shutter speed (i.e., the amount of time that each individual frame is exposed to light due to the camera's shutter being open, such as $\frac{1}{100}$ seconds).

If the camera captures the video content at a higher resolution, at a higher frame rate, and/or using a higher shutter speed, for instance, the video content will be larger in size and of higher quality, and thus a higher data rate may be needed to encode the video content and generate a video stream. Whereas, if the camera captures the video content at a lower resolution, at a lower frame rate, and/or using a lower shutter speed, for instance, the video content will be smaller in size and of lower quality, and thus a lower data rate may be needed to encode the video content and generate a video stream.

Accordingly, the act of computing device 202 selecting the data rate can involve referring to the table to select the data rate that corresponds to the camera settings of computing device 202. Alternatively, given a desired data rate, such as a user-specified data rate or a default data rate of computing device 202, the act of computing device 202 selecting the data rate can involve referring to the table to select the camera settings that computing device 202 should use to achieve the desired data rate.

In some implementations, computing device 202 can select the data rate based on a type of network connection over which computing device 202 transmits data, such as the generated video stream, to other devices. For example, if computing device 202 has a connection with a cellular network (e.g., 3G, 4G LTE), computing device 202 can by default select a lower data rate (e.g., 75 kbps) to reduce excessive cellular data consumption. As another example, if computing device 202 has a connection with a Wi-Fi network, computing device 202 can by default select a higher data rate (e.g., 450 kbps). Other techniques for selecting the data rate are possible as well.

As noted above, the act of computing device 202 encoding the video content can involve encoding the video content in accordance with one or more encoding parameters to generate the video stream. For example, computing device 202 can encode the video content according to various encoding standards, such as the H.264 (MPEG-4 AVC) standard, the MPEG-2 Part 2 standard, or the VP8 standard. Such standards can affect the data rate of the resulting video stream while also affecting other properties of the resulting video stream as well.

To illustrate this, consider for example a scenario in which computing device 202 encodes video content using a first standard (e.g., H.264) to produce a first video stream, and separately encodes the same video content using a second, different standard (e.g., MPEG-2 Part 2) to produce a second video stream. In this scenario, both the first video stream and the second video stream can have low data rates, but the first video stream can be of higher quality than the second video stream. Alternatively, the first video stream can have a lower data rate than the second video stream and be of higher quality than the second video stream.

Accordingly, in some implementations, the act of computing device 202 selecting the data rate can involve selecting an encoding standard for use in encoding the video content to generate the video stream having the data rate. For instance, computing device 202 can have stored various encoding standard options from which to choose, and can select a particular encoding standard to be used as a default encoding standard unless instructed or configured to select a different encoding standard. In another instance, a user of computing device 202 can specify a particular encoding standard via a user interface of computing device 202 or by other means, thereby instructing computing device 202 to use the user-specified encoding standard. In yet another instance, given a desired data rate, the act of computing device 202 selecting the data rate can involve selecting the encoding standard that computing device 202 should use to achieve the desired data rate.

In some instances, the act of generating the video stream can also be considered to involve the computing device 202 transmitting the video stream (i.e., the packets of the video stream) from the memory buffer to another memory buffer and/or device, such as to a second memory buffer of computing device 202. In one example, in an arrangement where computing device 202 has a cellular or Wi-Fi network connection, an entity of the cellular or Wi-Fi network can monitor the amount of packets in the second memory buffer of computing device 202 and instruct computing device 202 to transmit packets from the second memory buffer to the entity based on considerations of network bandwidth and/or other channel quality conditions.

The act of generating the video stream can involve other actions as well.

B. Dynamically Adjusting the Data Rate of the Video Stream

As noted above, while computing device 202 is generating the video stream, computing device 202 can determine an amount of packets in the memory buffer.

In addition, while computing device 202 is generating the video stream, computing device 202 can determine a time period since the data rate of the video stream was last adjusted. In scenarios where computing device 202 is determining the time period but has not yet adjusted the data rate of the video stream, such as a scenario in which computing device 202 has recently started generating a video stream having a default data rate, the act of computing device 202 determining the time period since the data rate of the video stream was last adjusted can involve determining a time period since another type of event occurred. For example, the other type of event can be one of the following: (i) when computing device 202 first selected the data rate, (ii) when computing device 202 first began encoding the video content, or (iii) when the encoder transmitted the first packet(s) of the video stream to the memory buffer, among other possibilities.

Once computing device 202 has determined the amount of packets in the memory buffer and determined the time period since the data rate of the video stream was last adjusted, computing device 202 can then use the determined amount of packets and time period as a basis to adjust the data rate of the video stream. Computing device 202 can adjust the data rate by performing various actions, such as by changing one or more encoding parameters (e.g., switching from one standard to another) and/or adjusting one or more camera settings noted above. Other possible actions for adjusting the data rate are possible as well.

In some aspects, the act of computing device 202 using the determined amount of packets and time period as a basis to adjust the data rate can involve making comparisons of the determined amount of packets and time period to respective thresholds and then either increasing or decreasing the data rate based on the result of those comparisons.

In one aspect, for instance, computing device 202 can (i) determine that the determined amount of packets are less than a threshold amount of packets, (ii) determine that the determined time period is greater than a threshold time period, and (iii) in response to those two determinations, increase the data rate of the video stream. In this aspect, computing device 202 can use various thresholds, such as a threshold amount of packets having a value in a range of 5 to 15 packets, and a threshold time period having a value in a range of 10 to 20 seconds. By way of example, if computing device 202 determines that there are less than 10 packets in the memory buffer and at least 15 seconds have passed since the data rate was last adjusted (increased or decreased), computing device 202 can responsively adjust the data rate by increasing the data rate by a particular increment.

In another aspect, computing device 202 can (i) determine that the determined amount of packets are greater than a threshold amount of packets, (ii) determine that the determined time period is greater than a threshold time period, and (iii) in response to those making those two determinations, decrease the data rate of the video stream. In this aspect, computing device 202 can use various thresholds, such as a threshold amount of packets having a value in a range of 20 to 35 packets, and a threshold time period having a value in a range of 1 to 10 seconds. By way of example, if computing device 202 determines that there are more than 30 packets in the memory buffer and at least 3 seconds have passed since the data rate was last adjusted (increased or decreased), computing device 202 can responsively adjust the data rate by decreasing the data rate by a particular increment.

The increment by which computing device 202 adjusts the data rate can be determined in various ways. In some instances, computing device 202 can determine the increment based on the type of network connection over which computing device 202 is transmitting the video stream to other devices. For example, if computing device 202 determines that it is transmitting the video stream over a cellular network connection, computing device 202 can responsively determine the increment to be a value within a range of 25 kbps to 75 kbps and then adjust the data rate by the determined increment. Whereas, if computing device 202 determines that it is transmitting the video stream over a Wi-Fi network connection, computing device 202 can responsively determine the increment to be a value within a range of 100 kbps to 150 kbps and then adjust the data rate by the determined increment.

In some aspects, the act of computing device 202 determining the increment can involve using a default, fixed increment for all adjustments to the data rate. For example, if computing device 202 has a Wi-Fi network connection, computing device 202 can adjust the data rate by a fixed increment of 125 kbps for every adjustment, whereas if computing device 202 has a cellular network connection, computing device 202 can adjust the data rate by a fixed increment of 50 kbps for every adjustment. In these aspects, the default increment can correspond to data rates at which significant, noticeable, or otherwise desirable jumps in video stream quality occur. For example, in some scenarios, when computing device 202 has a Wi-Fi network connection, significant jumps in video stream quality can occur when the data rate is adjusted by an increment of 125 kbps, such as at 500 kbps, 625 kbps, 750 kbps, 875 kbps, 1000 kbps, 1125 kbps, 1250 kbps, and 1375 kbps, and thus 125 kbps can be the fixed increment. Whereas, when computing device 202 has a cellular network connection, significant jumps in video stream quality can occur when the data rate is adjusted by an increment of 50 kbps, such as at 100 kbps, 150 kbps, 200 kbps, 250 kbps, 300 kbps, 350 kbps, 400 kbps, 450 kbps, and 500 kbps, and thus 50 kbps can be the fixed increment.

In other aspects, the act of computing device 202 determining the increment can involve determining, for each respective adjustment to the data rate, which increment to use. As a result, computing device 202 can in some scenarios use different increments for at least two successive adjustments to the data rate. For example, computing device 202 can determine, based on one or more of the factors discussed above, such as network connection, packets in the memory buffer, and/or time period since last adjustment, etc., to use a first increment for a first adjustment to the data rate (e.g., decrease the data rate from 1375 kbps to 1125 kbps by a first increment of 250 kbps), but can next determine, based on one or more of the factors, to use a second, different increment for a second, subsequent adjustment to the data rate (e.g., decrease the data rate from 1125 kbps to 125 kbps by a second increment of 125 kbps). Other techniques for determining the increment are possible as well.

In some aspects, the data rate of the video stream can be confined to a particular range. For example, when computing device 202 has a Wi-Fi network connection, the data rate can be confined to a range of 450 kbps to 1500 kbps such that the data rate never falls below 450 kbps and never exceeds 1500 kbps. Whereas, when computing device 202 has a cellular network connection, the data rate can be confined to a range of 75 kbps to 500 kbps such that the data rate never falls below 75 kbps and never exceeds 1500 kbps.

Computing device 202 can perform the acts discussed above in a periodic manner, in order to maintain higher quality of the video stream while minimizing latency. For example, once computing device 202 determines that there are 10 or less packets in the memory buffer, computing device 202 can repeatedly increase the data rate of the video stream every 15 seconds until there are more than 10 packets in the memory buffer. As another example, once computing device 202 determines that there are at least 30 packets in the memory buffer, computing device 202 can repeatedly decrease the data rate of the video stream every 3 seconds until there are less than 30 packets in the memory buffer. Other examples are possible as well.

In some implementations, while computing device 202 is generating the video stream, computing device 202 can transmit the video stream to another computing system, such as VBS 204, via a communication interface with the other computing system (e.g., communication interface 106). The other computing system can then receive and broadcast the video stream.

In some implementations, while computing device 202 is generating the video stream, computing device 202 can present, via user interface of computing device 202 (e.g., user interface 108), an indication of the data rate of the video stream. In these implementations, the indication can be an indication of the default data rate for the video stream and/or an indication of an adjusted data rate. Further, computing device 202 can present the indication in response to various events. For instance, computing device 202 can present the indication in response to computing device 202 beginning to generate the video stream and/or in response to computing device 202 adjusting the data rate.

The indication of the data rate can take various forms. For example, computing device 202 can provide, via a speaker of computing device 202, an audio indication of the data rate (e.g., playing the words "one hundred and fifty kilobits per second" out of the speaker). Additionally or alternatively, computing device 202 can provide, via a display of computing device 202, a visual indication of the data rate, such as a numeric indication (e.g., "150 kbps") and/or an indication of how the data rate has been adjusted (e.g., "The data rate has been adjusted from 150 kbps to 200 kbps."). Other example indications of the data rate are possible as well.

In some implementations, while computing device 202 is generating the video stream, computing device 202 can present the video stream via the display. Computing device 202 can present the video stream in various forms. In some instances, computing device 202 can display only the video stream having the adjusted data rate. Alternatively, computing device 202 can display only the video stream having the last-adjusted data rate (i.e., the video stream before the most recent adjustment to the data rate). Further, in other instances, computing device 202 can simultaneously display two different forms of the video stream. For example, computing device 202 can simultaneously display a split-screen including both the unencoded video content (e.g., an uncompressed version of the video stream) and the video stream having the adjusted data rate. As another example, computing device 202 can simultaneously display a split-screen including both the video stream having the most recent adjusted data rate and the video stream having the previous data rate (i.e., the data rate before it was adjusted).

In any or all of the implementations described above, computing device 202 can provide the video stream via the display of computing device 202 with or without the indication of the data rate.

Figure 3:
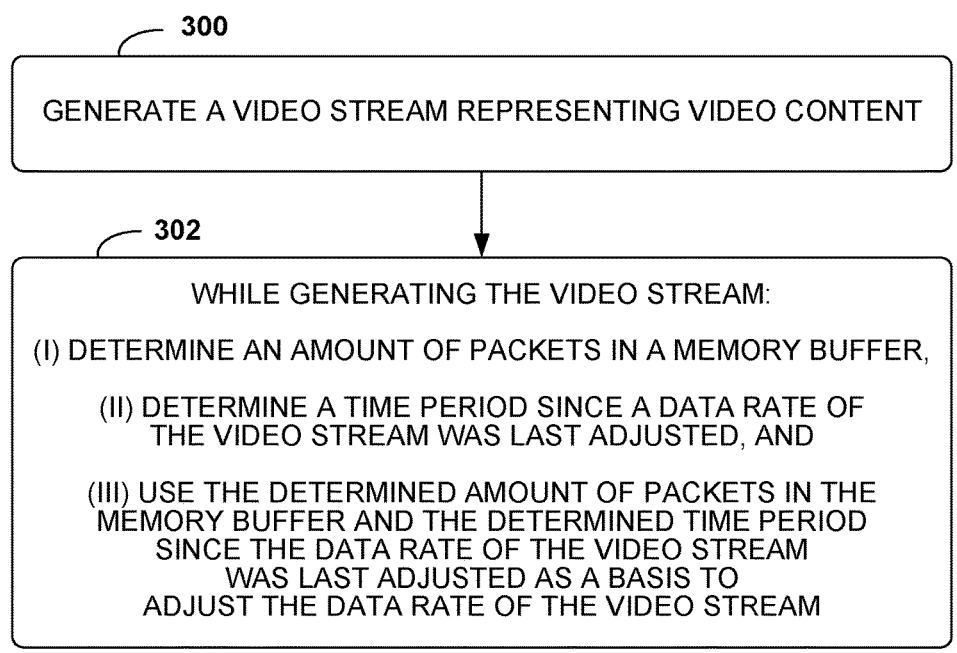
FIG. 3 is a simplified illustration of a flowchart of an example method.

FIG. 3 is a simplified illustration of an example flowchart for dynamically adjusting a data rate of a video stream. In an example implantation, a computing system such as computing device 202 performs the illustrated acts, although in other implementations, one or more other systems (e.g., VBS 204) can perform some or all of the illustrated acts.

As shown in FIG. 3, at block 300, the computing system generates a video stream representing video content.

Next, at block 302, while generating the video stream, the computing system (i) determines an amount of packets in a memory buffer, (ii) determines a time period since a data rate of the video stream was last adjusted, and then (iii) uses the determined amount of packets in the memory buffer and the determined time period since the data rate of the video stream was last adjusted as a basis to adjust the data rate of the video stream.

IV. Example Variations

Although some of the acts and/or functions described in this disclosure have been described as being performed by a particular entity, such acts and/or functions can be performed by any entity, such as those described in this disclosure. Further, although the described acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the described acts and/or functions need to be performed to achieve one or more of the benefits provided by this disclosure, and therefore not all acts and/or functions are required.

Although certain variations have been discussed in connection with one or more example of this disclosure, such variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A method comprising:
    generating, by a computing system, a video stream representing video content; and
    while generating the video stream:
        (i) determining, by the computing system, an amount of packets in a memory buffer;
        (ii) determining, by the computing system, a time period since a data rate of the video stream was last adjusted;
        (iii) determining, by the computing system, from among a group of network connection types, a network connection type of a network connection via which the computing system is transmitting the video stream, wherein each network connection type of the group corresponds with a respective data rate increment that is different from the data rate increments that correspond with the other network connection types of the group;
        (iv) selecting by the computing system, the data rate increment that corresponds with the determined network connection type; and
        (v) using, by the computing system, the determined amount of packets in the memory buffer, the determined time period since the data rate of the video stream was last adjusted, and the selected data rate increment as a basis to adjust the data rate of the video stream.

2. The method of claim 1, wherein the memory buffer is a data queue of the computing system.

3. The method of claim 1, wherein using the determined amount of packets in the memory buffer, the determined time period since the data rate of the video stream was last adjusted, and the selected data rate increment as a basis to adjust the data rate of the video stream comprises:
    making, by the computing system, a first determination that the determined amount of packets in the memory buffer is less than a threshold amount of packets;
    making, by the computing system, a second determination that the determined time period since the data rate of the video stream was last adjusted is greater than a threshold time period; and
    responsive to making the first and second determinations, increasing, by the computing system, the data rate of the video stream by the selected data rate increment.

4. The method of claim 3, wherein the threshold amount of packets is a value in a range of 5-15 packets, and wherein the threshold time period is a value in a range of 10-20 seconds.

5. The method of claim 3,
    wherein determining the network connection type of the network connection via which the computing system is transmitting the video stream comprises determining the network connection type to be a Wi-Fi connection.

6. The method of claim 5, wherein the selected data rate increment that corresponds to the determined network connection type is a value in a range from 100 kilobits per second to 150 kilobits per second.

7. The method of claim 3,
    wherein determining the network connection type of the network connection via which the computing system is transmitting the video stream comprises determining the network connection type to be a cellular network connection.

8. The method of claim 7, wherein the selected data rate increment that corresponds to the determined network connection type is a value in a range from 25 kilobits per second to 75 kilobits per second.

9. The method of claim 1, wherein using the determined amount of packets in the memory buffer, the determined time period since the data rate of the video stream was last adjusted, and the selected data rate increment as a basis to adjust the data rate of the video stream comprises:
    making, by the computing system, a first determination that the determined amount of packets in the memory buffer is greater than a threshold amount of packets;

making, by the computing system, a second determination that the determined time period since the data rate of the video stream was last adjusted is greater than a threshold time period; and responsive to making the first and second determinations, decreasing, by the computing system, the data rate of the video stream by the selected data rate increment.

10. The method of claim 9, wherein the threshold amount of packets is a value in a range of 20-35 packets, and wherein the threshold time period is a value in a range of 1-10 seconds.

11. The method of claim 9,
wherein determining the network connection type of the network connection via which the computing system is transmitting the video stream comprises determining the network connection type to be a Wi-Fi connection.

12. The method of claim 11, wherein the selected data rate increment that corresponds to the determined network connection type is a value in a range from 100 kilobits per second to 150 kilobits per second.

13. The method of claim 9,
wherein determining the network connection type of the network connection via which the computing system is transmitting the video stream comprises determining the network connection type to be a cellular network connection.

14. The method of claim 13, wherein the selected data rate increment that corresponds to the determined network connection type is a value in a range from 25 kilobits per second to 75 kilobits per second.

15. The method of claim 1, wherein the computing system is a first computing system, the method further comprising:
while generating the video stream:
(iv) transmitting, by the first computing system, to a second computing system, the video stream, wherein the second computing system is configured for receiving the video stream from the first computing system and for broadcasting the video stream.

16. The method of claim 1, further comprising:
presenting, by the computing system, via a user interface, an indication of the adjusted data rate.

17. A non-transitory computer readable medium having stored thereon instructions that, upon execution by a processor, cause performance of a set of acts comprising:
generating, by a computing system, a video stream representing video content; and
while generating the video stream:
(i) determining, by the computing system, an amount of packets in a memory buffer;
(ii) determining, by the computing system, a time period since a data rate of the video stream was last adjusted;
(iii) determining, by the computing system, from among a group of network connection types, a network connection type of a network connection via which the computing system is transmitting the video stream, wherein each network connection type of the group corresponds with a respective data rate increment that is different from the data rate increments that correspond with the other network connection types of the group;
(iv) selecting, by the computing system, the data rate increment that corresponds with the determined network connection type; and
(v) using, by the computing system, the determined amount of packets in the memory buffer, the determined time period since the data rate of the video stream was last adjusted, and the selected data rate increment as a basis to adjust the data rate of the video stream.

18. The non-transitory computer readable medium of claim 17, wherein using the determined amount of packets in the memory buffer, the determined time period since the data rate of the video stream was last adjusted, and the selected data rate increment as a basis to adjust the data rate of the video stream comprises:
making, by the computing system, a first determination that the determined amount of packets in the memory buffer is less than a threshold amount of packets;
making, by the computing system, a second determination that the determined time period since the data rate of the video stream was last adjusted is greater than a threshold time period; and
responsive to making the first and second determinations, increasing, by the computing system, the data rate of the video stream by the selected data rate increment.

19. The non-transitory computer readable medium of claim 17, wherein using the determined amount of packets in the memory buffer, the determined time period since the data rate of the video stream was last adjusted, and the selected data rate increment as a basis to adjust the data rate of the video stream comprises:
making, by the computing system, a first determination that the determined amount of packets in the memory buffer is greater than a threshold amount of packets;
making, by the computing system, a second determination that the determined time period since the data rate of the video stream was last adjusted is greater than a threshold time period; and
responsive to making the first and second determinations, decreasing, by the computing system, the data rate of the video stream by the selected data rate increment.

20. A computing system comprising:
a memory buffer,
wherein the computing system is configured for performing a set of acts comprising:
generating a video stream representing video content; and
while generating the video stream:
(i) determining an amount of packets in the memory buffer;
(ii) determining a time period since a data rate of the video stream was last adjusted;
(iii) determining, by the computing system, from among a group of network connection types, a network connection type of a network connection via which the computing system is transmitting the video stream, wherein each network connection type of the group corresponds with a respective data rate increment that is different from the data rate increments that correspond with the other network connection types of the group;
(iv) selecting, by the computing system, the data rate increment that corresponds with the determined network connection type; and
(iii) using the determined amount of packets in the memory buffer, the determined time period since the data rate of the video stream was last adjusted, and the selected data rate increment as a basis to adjust the data rate of the video stream.

* * * * *